(12) United States Patent
Stavrou et al.

(10) Patent No.: US 11,742,484 B2
(45) Date of Patent: Aug. 29, 2023

(54) SYNTHESIS OF ALKALI METAL-BASED PHOSPHOROUS COMPOUNDS USING A LOWER PRESSURE

(71) Applicant: Lawrence Livermore National Security, LLC, Livermore, CA (US)

(72) Inventors: Elissaios Stavrou, Livermore, CA (US); River Alyn Leversee, Portage, MI (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 285 days.

(21) Appl. No.: 16/908,492

(22) Filed: Jun. 22, 2020

(65) Prior Publication Data

US 2021/0043933 A1     Feb. 11, 2021

Related U.S. Application Data

(60) Provisional application No. 62/883,529, filed on Aug. 6, 2019.

(51) Int. Cl.
| | |
|---|---|
| H01M 4/58 | (2010.01) |
| H01M 4/04 | (2006.01) |
| H01M 4/136 | (2010.01) |
| C01B 25/08 | (2006.01) |
| B01J 3/04 | (2006.01) |
| H01M 10/0525 | (2010.01) |
| H01M 4/02 | (2006.01) |

(52) U.S. Cl.
CPC ............. *H01M 4/5805* (2013.01); *B01J 3/04* (2013.01); *C01B 25/081* (2013.01); *H01M 4/043* (2013.01); *H01M 4/136* (2013.01); *C01P 2002/72* (2013.01); *C01P 2002/76* (2013.01); *C01P 2002/77* (2013.01); *C01P 2006/40* (2013.01); *H01M 10/0525* (2013.01); *H01M 2004/027* (2013.01)

(58) Field of Classification Search
CPC .... H01M 4/5805; H01M 4/043; H01M 4/136; H01M 10/0525; H01M 2004/027; B01J 3/04; B01J 2219/02; B01J 2219/0204; B01J 2219/0231; C01B 25/081; C01P 2002/72; C01P 2002/76; C01P 2002/77; C01P 2006/40; Y02E 60/10
See application file for complete search history.

(56) References Cited

PUBLICATIONS

Brauer et al., "Konstitution von Phosphiden, Arseniden, Antimoniden und Wismutiden des Lithiums, Natriums und Kaliums," Z. physikal. Chem, 1937, pp. 323-352.

Leonova et al., "High-Pressure Phase Transition of Hexagonal Alkali Pnictides," Inorganic Materials, vol. 39, No. 3, 2003, pp. 266-270.

Zhao et al., "Pressure-Induced Stable Li5P for High-Performance Lithium-Ion Batteries," The Journal of Physical Chemistry, 2017, pp. 21199-21205.

(Continued)

*Primary Examiner* — Andrew J. Oyer
(74) *Attorney, Agent, or Firm* — Zilka-Kotab, P.C.

(57) ABSTRACT

A method for synthesizing an alkali metal-based phosphorous compound includes contacting an elemental alkali metal with elemental phosphorous to create a mixture and applying a pressure of less than 20 gigapascals to the mixture for forming the alkali metal-based phosphorous compound.

20 Claims, 11 Drawing Sheets

(56) References Cited

PUBLICATIONS

Dong et al., "How do chemical properties of the atoms change under pressure?" arXiv, Mar. 2015, 19 pages, retrieved from https://www.researchgate.net/publication/273067547_How_do_chemical_properties_of_the_atoms_change_under_pressure.
Dong et al., "Reinvestigation of Na3P based on single-crystal data," Acta Crystallographica, vol. E61, Oct. 8, 2005, pp. i223-i224.
Dong et al., "Reinvestigation of trilithium phosphide, Li3P," Acta Crystallographica, vol. E63, 2007, pp. i197-i198.
Hanfland et al., "Equation of state of lithium to 21 Gpa," Solid State Communications, vol. 112, 1999, pp. 123-127.
Hanfland, et al., "Sodium under pressure: bcc to fcc structural transition and pressure-volume relation to 100 Gpa," Physical Review B, vol. 65, No. 184109, May 13, 2002, pp. 1-8.

SYNTHESIS OF ALKALI METAL-BASED PHOSPHOROUS COMPOUNDS USING A LOWER PRESSURE

RELATED APPLICATION

This application claims priority to U.S. Provisional Patent Application No. 62/883,529 filed Aug. 6, 2019, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to phosphorous-based compounds, and more particularly, this invention relates to an alkali metal-based phosphorous compound usable, e.g., as an anode material, and methods of making same.

BACKGROUND

Commercially available anode materials for lithium ion batteries (LIBs) have practical limitations in performance, so it would be desirable to find new anode materials for improved performance. The next generation of LIBs and the practical realization of sodium ion batteries (NIBs) are both directly related to the challenging effort of finding suitable anode materials that simultaneously exhibit high specific capacity and small volumetric expansion to increase stability to electrochemical degradation, during lithiation and sodiation. NIBs are a promising alternative to LIBs. However, the unsuitability of the traditional materials (graphite and silicon) used for LIBs hinder practical applications of NIBs. Successful formation of such materials may be the basis of a major breakthrough in the field.

SUMMARY

In one embodiment, a method for synthesizing an alkali metal-based phosphorous compound includes contacting an elemental alkali metal with elemental phosphorous to create a mixture and applying a pressure of less than 20 gigapascals to the mixture for forming the alkali metal-based phosphorous compound.

In another embodiment, a system includes a mixture of an elemental alkali metal and an elemental phosphorous, and a device for applying pressure to the mixture, where the device is configured to apply a pressure less than 20 gigapascals to the mixture.

Other aspects and implementations of the presently described inventive concepts will become apparent from the following detailed description, which, when taken in conjunction with the drawings, illustrate by way of example the principles of the invention.

DETAILED DESCRIPTION

Figure 1:
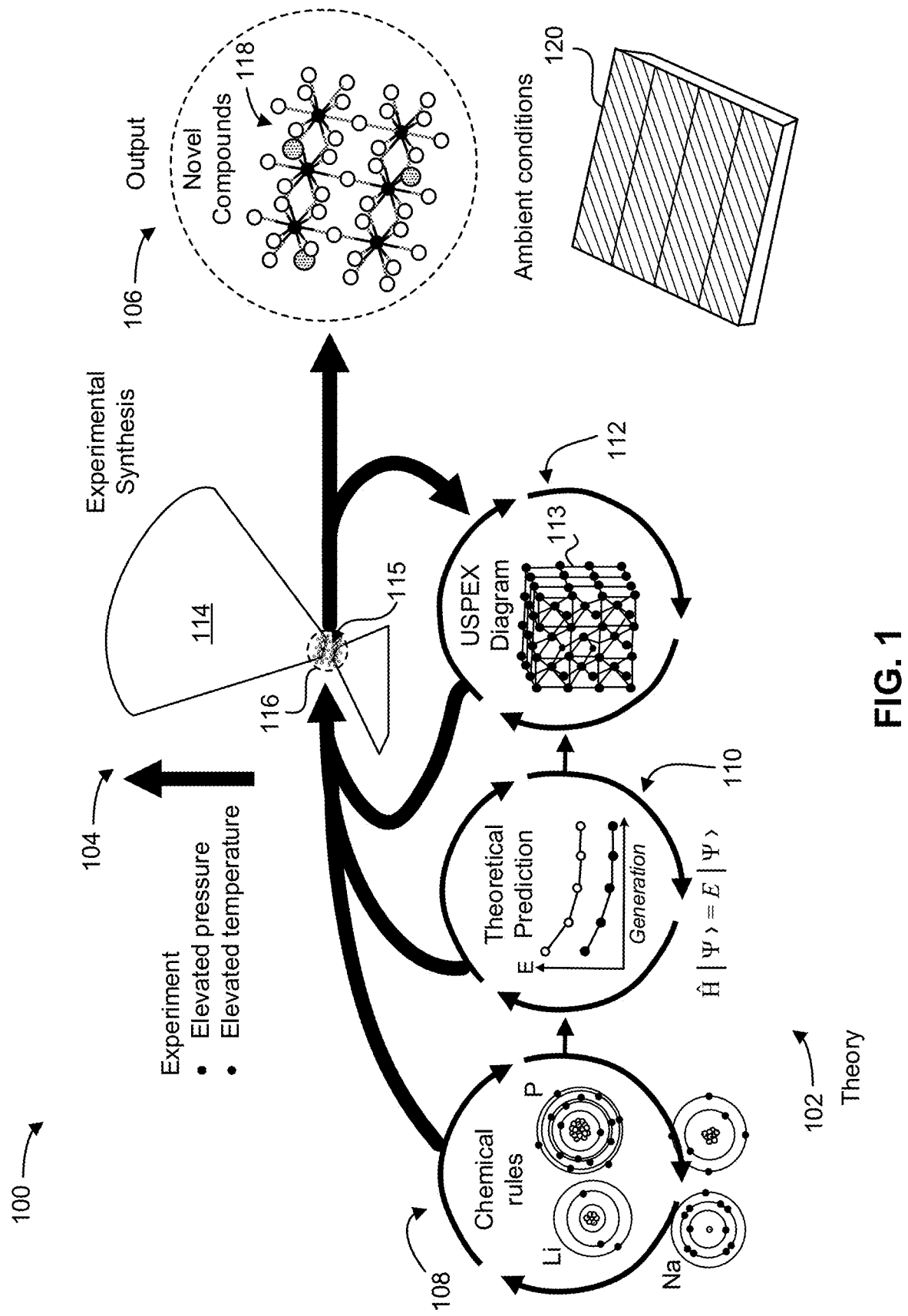
FIG. 1 is a schematic drawing of a feedback process between the experimental process and theory for material synthesis, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

For the purposes of this application, room temperature is defined as in a range of about 20° C. to about 25° C.

Unless expressly defined otherwise herein, each component listed in a particular approach may be present in an effective amount. An effective amount of a component means that enough of the component is present to result in a discernable change in a target characteristic of the final product in which the component is present, and preferably results in a change of the characteristic to within a desired range. One skilled in the art, now armed with the teachings herein, would be able to readily determine an effective amount of a particular component without having to resort to undue experimentation.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiment to create additional and/or alternative embodiments thereof.

Moreover, the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

The following description discloses several preferred inventive concepts of synthesizing alkali metal-based phosphorous compounds using lower pressure and/or related systems and methods.

In one general embodiment, a method for synthesizing an alkali metal-based phosphorous compound includes contacting an elemental alkali metal with elemental phosphorous to create a mixture and applying a pressure of less than 20 gigapascals to the mixture for forming the alkali metal-based phosphorous compound.

In another general embodiment, a system includes a mixture of an elemental alkali metal and an elemental phosphorous, and a device for applying pressure to the mixture, where the device is configured to apply a pressure less than 20 gigapascals to the mixture.

A list of abbreviations and acronyms used in the description is provided below.
AIRSS ab-initio random structure searching
B, B' bulk modulus, first derivative bulk modulus
BCC body-centered cubic crystal structure
B-M Birch-Murnaghan equation
C Celsius
DAC diamond anvil cell
EOS Equation of state
FCC face-centered cubic crystal structure
GPa Gigapascal
K kelvin
Li lithium
LIB Lithium-Ion-Batteries
μm micron
mAh/g milli Ampere-hours per gram
Na sodium
NIBs Sodium-Ion Batteries
nm nanometer
P phosphorous
RT room temperature
Si silicon
$V_{p.f.u}$ Volume per formula unit
XRD X-ray diffraction In one embodiment, phosphorus (P) is proposed as a promising alternative to silicon (Si) or graphite in anodes for lithium ion batteries (LIBs). In one approach, P-based anodes may also be suitable for sodium ion batteries (NIBs), while conventional anode materials such as Si and graphite are not suitable for NIBs. However, conventional methods to synthesize material comprising phosphorous (P) include many steps, require high temperatures, utilize catalysts, are very expensive, are very complicated, etc. For example, conventional methods to synthesize alkali metal-based phosphorous compounds require extended and complicated chemical procedures, including prolonged stepwise heating to greater than 400° C. of elements or precursors (e.g., LiP+Li) in an autoclave. It would be desirable to bring together the two elements, e.g., lithium/sodium and phosphorous, without the complicated steps, temperatures, catalysts, etc. that are required in conventional methods.

In various embodiments described herein, the reaction pathways between Li/Na and P may be of key importance to P-based anode synthesis. In one embodiment, pressure is used as a thermodynamic stimulus for forming P-based anodes. The approaches described herein provide a method of altering the compositional landscape aiming to synthesize material with tailored properties. In one aspect, tuning the composition of a chemical system beyond the thermodynamic stable chemical system at ambient conditions enables the synthesis of novel materials.

Moreover, it was surprising to learn the compounds such as lithium and phosphorous, sodium and phosphorous, etc. may be combined using pressure as a thermodynamic stimulus at ambient conditions, and not at the higher pressures typically needed in conventional methods when pressure is used as a thermodynamic stimulus. For the purposes of this disclosure, ambient conditions are defined as having a temperature at room temperature (e.g., in a range of about 20° C. to about 25° C.) and atmospheric pressure. One of the advantages of the process includes no need to heat (i.e., raise the temperature above room temperature) the components of the reaction (e.g., Li+P, Na+P, etc.). It was surprising that some of the various process described herein resulted in 100% compression applying lower pressures, e.g., 1-2 gigapascals (GPa), at room temperature.

Another advantage of various processes described herein includes using lower pressure for the synthesis of the compound. For example, usually mass production of a compound using pressure as a thermodynamic stimulus includes a pressure of 20 GPa or less, but in some of the processes described herein, the applied pressure may be about 10 times lower, at 1 to 2 GPa for synthesis of alkali metal-phosphorous-based compounds, e.g., Li—P, Na—P, etc.

FIG. 1 shows a conceptual diagram of a feedback process 100 for forming phosphorous-based materials, in accordance with one embodiment. As an option, the present process 100 may be implemented to form materials such as those referred to in the other FIGS. described herein. Of course, however, this process 100 and others presented herein may be used to provide applications which may or may not be related to the illustrative embodiments listed herein. Further, the methods presented herein may be carried out in any desired environment. Moreover, more, or less operations than those shown in FIG. 1 may be included in process 100, according to various embodiments. It should also be noted that any of the aforementioned features may be used in any of the embodiments described in accordance with the various methods.

FIG. 1 illustrates a conceptual diagram of a feedback process 100 between theory 102 and experimental process 104 for synthesis of output 106 of material using an elevated pressure synthesis process. The theory 102 may involve theoretical considerations such as chemical rules 108, theoretical predictions 110, USPEX diagrams 112, etc. of the proposed components to form the desired compounds. For example, for a phosphorous-based anode material, the chemical rules 108 of lithium (Li), phosphorous (P), sodium (Na), etc. may be considered. Then including the chemical rules 108, a theoretical prediction 110 may be considered of these components, for example, employing prediction-based software to determine energy versus generation of these products. Moreover, the theoretical prediction 110 of the components may further include a USPEX diagram 112 of the proposed compound 113.

The feedback process 100 considers aspects of the theory 102 of the proposed compound 113 with conditions of the experimental process 104 to generate reactions 116 for forming the proposed compound 113. For example, the experimental process 104 may include elevated pressure and/or elevated temperature during the chemical reactions 116 of the desired components of the proposed compound 113. In one approach, the pressure applied to the chemical reaction may be tuned using a diamond anvil cell (DAC) 114.

In one approach of the feedback process 100, the experimental result from the experimental process 104 may be used to reconsider the theoretical considerations of the theory 102 of the feedback process 100.

The output 106 from the combined considerations of theory 102 and experimental process 104 includes novel compounds 118 as designed for the proposed compound 113. The novel compounds 118 may represent the final product 120 from the feedback process 100.

An advantage of the methods described herein includes bypassing complicated chemical synthesis methods allowing synthesis of novel materials using nontraditional chemical synthesis routes. Pressure promotes the formation of compounds with higher alkali metal content, i.e., formation of $Li_xP_{(1-x)}$ compounds where x increases with increasing pressure. For example, and not meant to be limiting in any way, formation of $Li_5P$ may occur at higher levels of pressure.

FIG. 1 also depicts a product 120 comprising novel compounds 118, in accordance with one embodiment. As an option, the present product 120 may be implemented in conjunction with features from any other embodiment listed herein, such as those described with reference to the other FIGs. Of course, however, such product 120 and others presented herein may be used in various applications and/or in permutations which may or may not be specifically described in the illustrative embodiments listed herein. Further, the product 120 presented herein may be used in any desired environment.

Understanding and controlling the relevant reaction pathways and mechanisms is critical for optimum design of material with practical applications.

Recent theoretical studies strongly suggest that anode materials for LIBs and NIBs based on phosphorous are capable of exhibiting record specific capacities (4326 mAh/g) with much lower volumetric expansion (<200%) than silicon via the formation of novel compounds, such as $Na_5P$ and $Li_5P$ and $Li_6P$.

Figure 2:
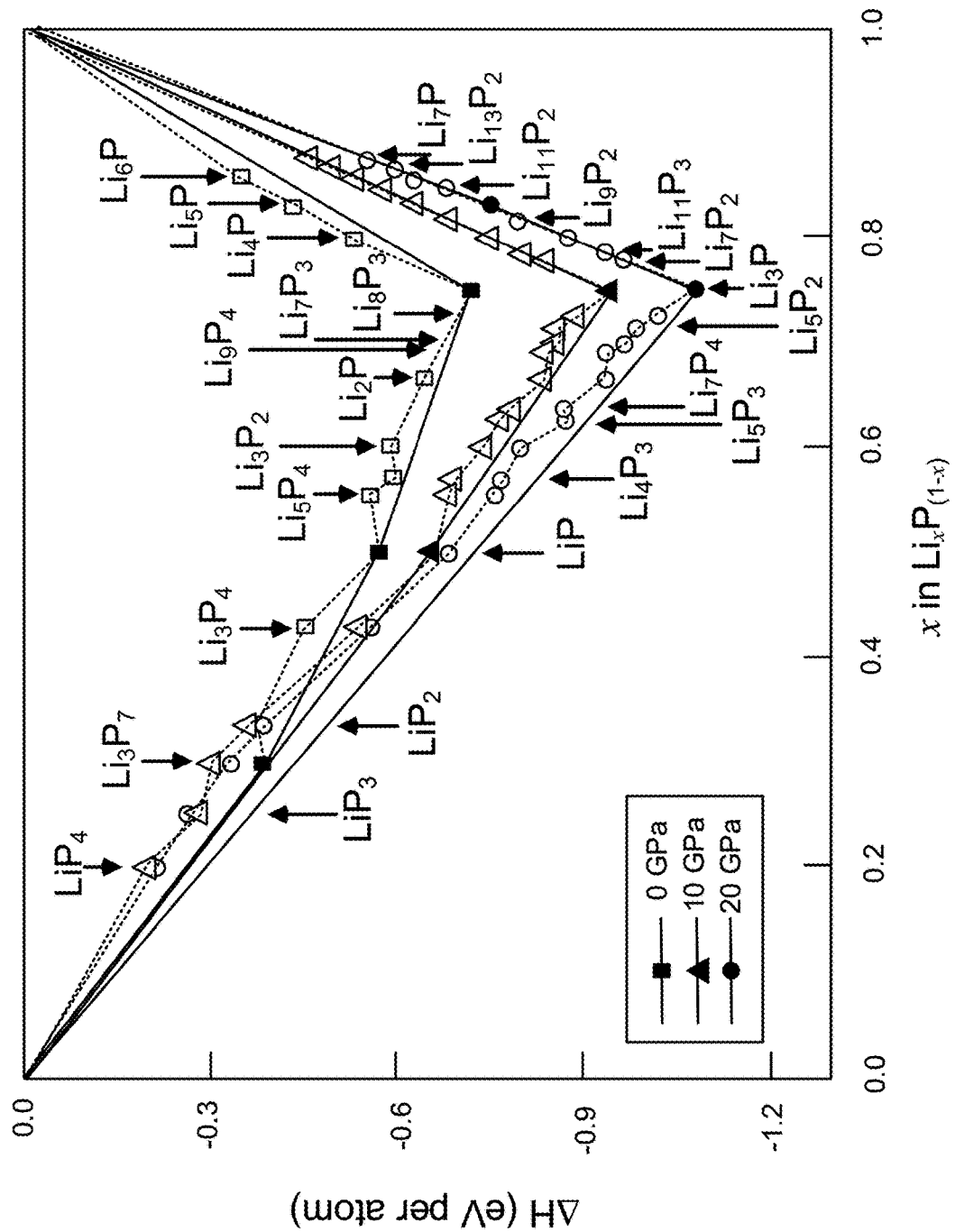
FIG. 2 depicts a plot of a calculated convex hull for Li—P compounds at 0, 10, and 20 GPa, according to one embodiment.

FIG. 2 represents a plot of a calculated convex hull for Li—P compounds at three different pressures 0, 10, and 20 GPa. The novel compounds are predicted to be very slightly above the ambient conditions convex hull (e.g., the stable compositions at a given pressure and temperature) and may be synthesized at lower pressures, e.g., lower than about 2 GPa. Lower pressure applied during synthesis has the additional advantage that the probability for metastability is increased. For instance, compounds with $Na_5P$ and $Na_6P$ stoichiometries have formation enthalpies just above the convex hull at ambient conditions. In addition to the possible applications of Li—P and Na—P materials in batteries, very recently a $Li_6P$ electride that becomes a superconductor with a superconducting transition temperature $T_c$ of 39.3 kelvin (K) was predicted.

As described herein, according to one embodiment, an enhanced reactivity of both alkali metals with phosphorous at slightly elevated pressures enables the synthesis of $Li_3P$ and $Na_3P$ at room temperature (RT) starting from element precursors, bypassing the established complicated chemical synthesis methods. Both compounds, $Li_3P$ and $Na_3P$, demonstrate a pressure induced phase transition toward a Fm-3m (FCC) structure, that may remain stable up to higher pressures.

Figure 3:
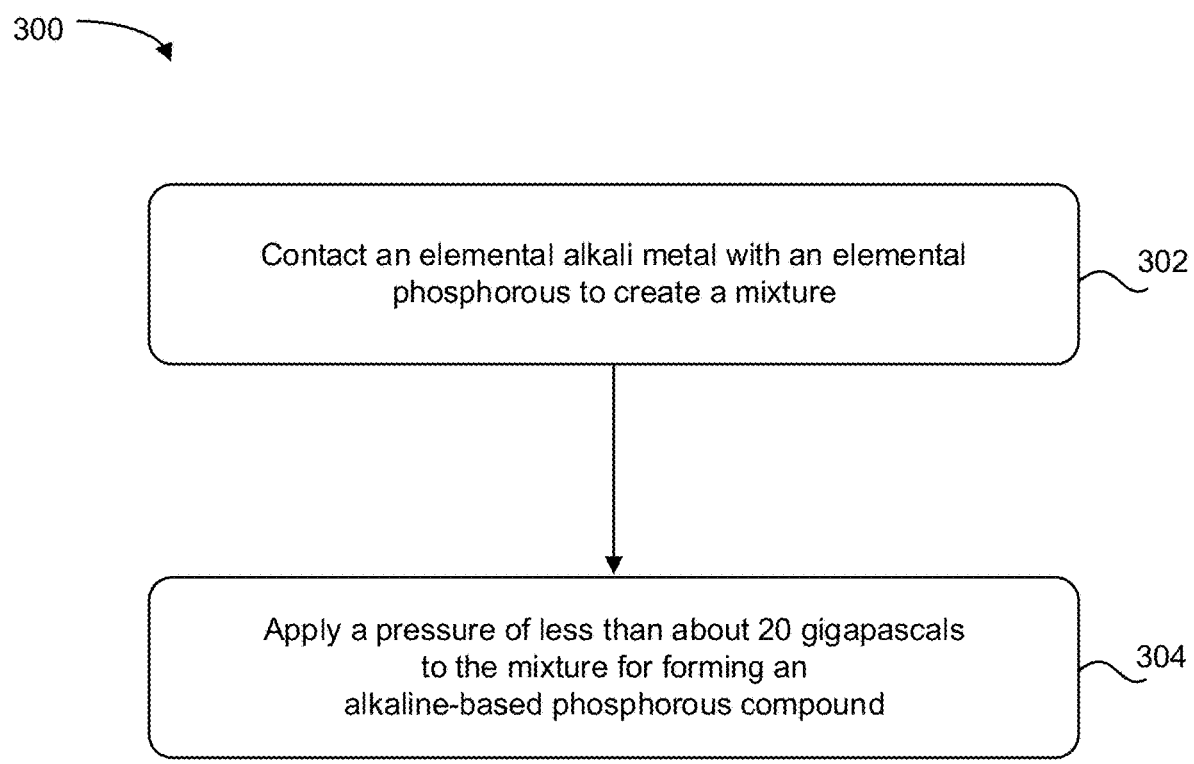
FIG. 3 is a flow chart of a method, according to one embodiment.

FIG. 3 depicts a flowchart of a method 300 for synthesizing an alkali metal-based phosphorous compound, in accordance with one embodiment. As an option, the present method 300 may be implemented to form materials such as those shown in the other FIGS. described herein. Of course, however, this method 300 and others presented herein may be used provide applications which may or may not be related to the illustrative embodiments listed herein. Further, the methods presented herein may be carried out in any desired environment. Moreover, more, or less operations than those shown in FIG. 3 may be included in method 300, according to various embodiments. It should also be noted that any of the aforementioned features may be used in any of the embodiments described in accordance with the various methods.

In one embodiment, method 300 for synthesizing an alkali metal-based phosphorous compound includes step 302 of contacting an elemental alkali metal with an elemental phosphorous to create a mixture. The contacting of the elemental alkali metal and the elemental phosphorous continues beyond the initial mixing to create a mixture. The contacting is prolonged throughout the application of pressure to the mixture.

Method 300 includes step 304 of applying a pressure of less than 20 gigapascals (GPa) to the mixture for forming an alkali metal-based phosphorous compound. In one approach, the method includes applying a pressure of less than about 10 GPa to the mixture. In yet another approach, the method includes applying a pressure of less than about 2 GPa to the mixture.

In some approaches, variable pressure may be used as proxy to the lithiation/sodiation procedures facilitating the structural characterization of the relevant intermediates. In one approach, a pressure may be selected for step 304 for application to the mixture in order to form an alkali metal-based phosphorous compound having a predefined property. In one approach, a predefined property may include the crystal structure of the formed alkali metal-based phosphorous compound. For example, applying a pressure less than about 5 GPa to the mixture may form an alkali metal-based phosphorous compound having a hexagonal crystal structure. In another example, applying a pressure greater than about 5 GPa to the mixture may form an alkali metal-based phosphorous compound having a face-centered cubic (FCC) crystal structure.

The method may be conducted at room temperature (RT), in which room temperature is defined as a temperature in a range of about 20 to about 25° C. Step 302 of contacting the elemental alkali metal and the elemental phosphorous to create a mixture may be conducted at RT. In preferred approaches, step 304 of applying less than 20 GPa pressure to the mixture is conducted at RT. In one approach, the method may be conducted at ambient temperature.

In one approach, the elemental alkali metal may include lithium. In another approach, the elemental alkali metal may include sodium. In yet another approach, the elemental alkali metal may include potassium. In preferred approaches, the elemental alkali metal and elemental phosphorous may be substantially pure. For example, the elemental alkali metal and elemental phosphorous may each have greater than 99% purity. Preferably, the elemental alkali metal and elemental phosphorous have greater than 99.9% purity.

In some approaches, the elemental alkali metal and elemental phosphorous may each be in powder form prior to the contacting, and the powders combined to create a mixture. In one approach, the elemental alkali metal and elemental phosphorous may include small solid pieces, for example, having an average diameter in a range of the micron scale or less.

In one approach, the formed alkali metal-based phosphorous compound may include a ratio of elemental alkali metal (A) to elemental phosphorous (P), where the ratio of A to P increases with increasing applied pressure during the contacting.

In one embodiment, the elemental mixtures of Lithium-Phosphorous and Sodium-Phosphorous are used to synthesize lithium and sodium-rich phosphorous compounds ($Li_3P$, $Na_3P$, etc.) at lower pressures (<1 GPa) and at room temperature. According to one approach, a method generates compounds that may be synthesized bypassing very expensive and complicated conventional chemistry synthesis pathways.

Moreover, lower pressure at RT needed for the synthesis may be compatible with large volume presses that can substantially scale up the synthesis for practical applications. The $Li_3P$ and $Na_3P$ compounds are promising alternatives of conventional anode materials that could substantially improve performance in Li-Ion batteries (LIBs) and also mitigate the shortcoming of conventional anode materials (silicon and graphite) in the case of Sodium-Ion batteries (NIBs).

Structural Analysis

Figure 4:
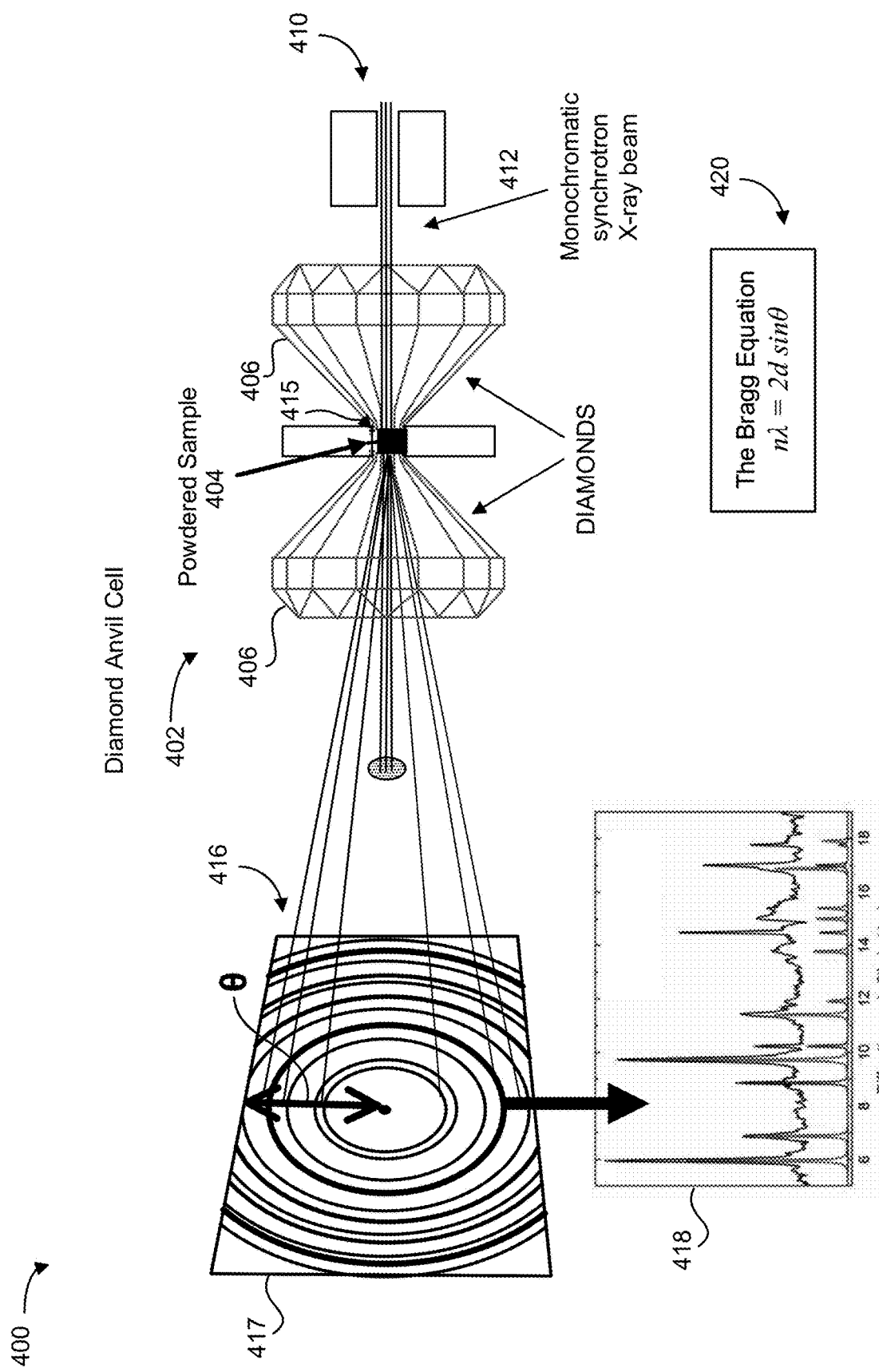
FIG. 4 is a schematic diagram of the X-ray diffraction measurements with diamond anvil cells, according to one embodiment.

A structural analysis process 400 of powdered sample of the synthesized compounds formed from elemental Li/Na and phosphorous (P) as depicted in FIG. 4 allows the characterization of the synthesized compounds. The structural analysis process 400 includes a diamond anvil cell (DAC) 402 in which a powdered sample 404 is loaded in a cavity 415 between the diamonds 406 of the DAC 402. The elements of the reaction may be mixed as a powder before addition to the DAC 402. For example, a powdered sample of a mixture of elemental Li/Na and red a-phosphorous may be loaded into the DAC 402. The pressure may be increased between the diamonds of the DAC.

Preferably, the only components added to the cavity 415 between the diamonds 406 include the elements of the reaction that are present in the product. In one approach, a mixture of an elemental alkali metal and an elemental phosphorous may be added to the cavity 415 between the diamonds 406. The reaction may occur at room temperature (RT). The process may not include added heat, elevation of temperature, etc. to the mixture in the cavity during the application of pressure by the DAC. In other approaches, a small amount of heat may be added.

Chemical reactions and phase transitions of the sample 404 in the diamond anvil cell 402 may be probed with X-ray diffraction using X-ray beams originating from a device 410 having micro-focusing optics. In one approach, the X-ray diffraction may include a monochromatic synchrotron X-ray beam 412. The X-ray beam 412 may be directed through the cavity 415. X-ray diffraction data 416 may be collected with an image plate detector 417 and displayed as a plot 418.

Pressure may be determined via a generally understood in the art equation of state (EOS) of Lithium and Sodium. For example, using the Bragg Equation 420, Equation 1 below, the pressure may be determined from the X-ray diffraction analysis plot 418.

$$n\lambda = 2d \sin \theta \quad \text{Equation 1}$$

In various embodiments, using methods described herein, $Li_3P$ and $Na_3P$ are synthesized at lower pressure, for example less than 20 GPa. The possible formation of known stable compounds in this system may be probed using only pressure as a thermodynamic stimulus. Contacting the elements at room temperature and lower pressure (less than 2 GPa) favors the reaction toward the formation of the products $Li_3P$ and $Na_3P$, as indicated by changes to the respective diffraction pattern.

Crystal structures of compounds may be identified by crystal structures in three dimensions relying on combinations of crystallographic point groups and lattice systems. The compounds synthesized following method herein may form a crystal structure having a hexagonal crystal structure, $P6_3/mmc$, a crystal structure having a face centered cubic (FCC) structure, Fm-3m, etc.

In one embodiment, the formed alkali metal-based phosphorous compound has a first crystal structure. A pressure may be applied to the formed alkali metal-based phosphorous compound to cause a phase transition to a second crystal structure that is different from the first crystal structure. In one approach, the formed alkali metal-based phosphorous compound has a hexagonal crystal structure, and then application of a pressure in a range of greater than 5 GPa to under 20 GPa to the alkali metal-based phosphorous compound may cause a phase transition to a face-centered cubic (FCC) crystal structure.

In one embodiment, varying pressure allows a structural study of synthesized $Li_3P$. Both predicted phases of $Li_3P$ may be observed with a phase transition occurring between 5.7 and 8.9 GPa. Moreover, the phase transition may be accompanied by substantial volume collapse.

In one embodiment, a system may include a mixture of an elemental alkali metal and an elemental phosphorous, and a device for applying pressure to the mixture. The device may be configured to apply a pressure less than about 20 GPa to the mixture. In one approach, the device may be configured to apply a pressure less than about 5 GPa. In another approach, the device may be configured to apply a pressure less than about 2 GPa. In one approach, the device may include a DAC to apply a pressure to the mixture.

In one embodiment, for synthesis reactions of elements that may occur under ambient conditions at selected lower pressures, the products may be synthesized for mass production using large volume presses that are much larger than diamond anvil cells.

For example, a lower pressure phase of $Li_3P$ may be hexagonal ($P6_3/mmc$); and following application of a higher pressure to the formed $Li_3P$ may cause a phase transition to the new phase of being face centered cubic, FCC, (Fm-3m). The change in crystal structure may be apparent in the X-ray diffraction patterns.

Figure 5A:
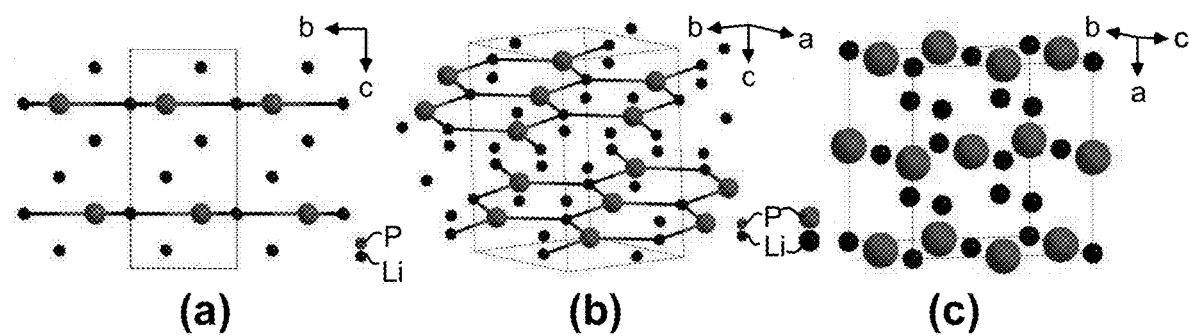
FIG. 5A are schematic representations of the crystal structure of $(Na/Li)_3P$, according to one embodiment. Part (a) is a side view of the ambient conditions crystal structure, part (b) is a perspective view of the ambient conditions crystal structure, and part (c) is a perspective view of the high-pressure FCC crystal structure.

A main structural characteristic of the synthesized structure is the presence of Na/Li—P graphite-like layers (in AB stacking) intercalated by two layers of Na/Li atoms. For example, parts (a) and (b) of FIG. 5A show schematic drawings (e.g., side-view and perspective view, respectively) of the crystal structure of $Li_3P$ compound at ambient conditions. The $Na_3P$ crystal structure is similar and may be drawn with Na atoms exchanged for. Li atoms. P atoms are five-fold coordinated by Na/Li atoms forming P(Na/Li)5 trigonal bipyramids linked by corner sharing.

Part (c) of FIG. 5A is a perspective view of a $Li_3P$ crystal structure formed from application of high pressure, e.g., greater than 6 GPa. As shown, the higher pressure forms an FCC crystal structure of $Li_3P$.

Figure 5B:
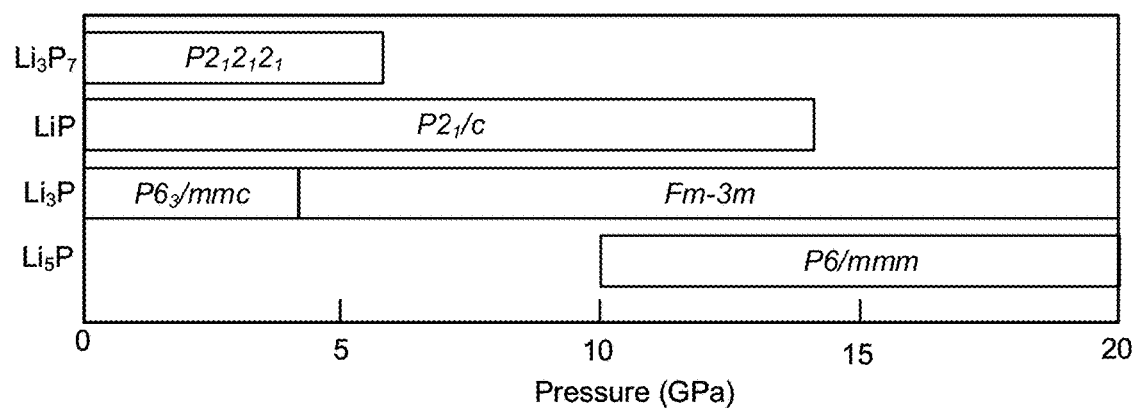
FIG. 5B is a diagram of predicted stable Li—P structures, according to some approaches.

FIG. 5B depicts a series of predicted stable Li—P structures formed at different pressures. For example, at pressures greater than 5 GPa, an FCC crystal structure of $Li_3P$ may be formed.

According to one embodiment, slightly elevated pressures enhance the reactivity of alkali metals and P. It may be possible for alkali-metal-rich compounds to be formed with mild temperature increases or even at room temperature (RT) under pressure.

The chemical reactivity of Na—P and Li—P systems, according to various embodiments, and the structural behavior of the relevant compounds were studied under high pressure conditions using synchrotron X-ray diffraction in a diamond anvil cell (DAC) up to 20 GPa combined with the ab-initio random structure searching (AIRSS) technique. Based on the results of this study, enhanced reactivity of both alkali metals with was observed at slightly elevated pressures facilitating the synthesis of $Li_3P$ and $Na_3P$ at RT thereby bypassing established chemical synthesis methods.

In some approaches, the formed alkali metal-based phosphorous compound may maintain a second crystal structure after release of the higher second applied pressure. For example, a face-centered cubic crystal structure of the compound may be maintained after release of the second applied pressure. In one approach, a pressure-induced phase transition towards a Fm-3m (FCC) structure that may remain stable up to 20 GPa may be observed, supported by the random structure searching techniques. Moreover, a compound formed by lower pressure synthesis process described herein maintains a stable structure during application of higher pressure and remains in a stable state when the pressure is released.

Experimental Methods

High purity, commercially available lithium (>99.9% purity, Sigma-Aldrich, St. Louis, Mo.), sodium (>99.95% purity, Sigma-Aldrich, St. Louis, Mo.) and amorphous red phosphorous (>99.9% purity, Sigma-Aldrich, St. Louis, Mo.) were used for the synthesis experiments. Rhenium gaskets were used being pre-indented to 40-50 micron (μm) thick using 400-500 μm diamond culets. Initial sample chamber diameters were nominally 100-200 μm. Red phosphorous was ground to a fine powder for the angle-dispersive X-ray diffraction (XRD) measurements and was loaded into a diamond anvil cell (DAC), filling about 10-25% of the DAC cavity volume. The remaining volume was filled with either Li or Na and small quantities of pressure sensors (gold and ruby) inside a glovebox at room temperature (RT). Pressure was determined through ruby luminescence, equation of state (EOS) of gold and the previously reported EOSs of Na and Li. All readings agreed with each other within 1 GPa at pressures>10 GPa.

A Pilatus 1M CdTe detector (Dectris, Philadelphia, Pa.) was used at the undulator X-ray diffraction (XRD) Beamline 13-ID-D at GeoSoilEnviroCARS, sector13, APS, Chicago, Ill.; a Pilatus 1M Si detector was used at the undulator X-ray diffraction (XRD) Beamline 16-IDB at High Pressure Collaborative Access Team (HPCAT), at the Advanced Photon Source (APS, Lemont, Ill.); and a MAR-345 image plate detector (MarXperts, Norderstedt, Germany) at the Advanced Light Source (Lawrence Berkeley National Laboratory, Berkeley, Calif.) Beamline 12.2.2 to collect pressure dependent X-ray diffraction data. The X-ray probing beam spot size was focused to approximately 2-4 μm at GeoSoilEnviroCARS and HPCAT and to 10 μm at beamline 12.2.2 using Kirkpatrick-B Baez mirrors. XRD data were collected in situ at high temperature and on the quenched samples.

Double-sided CW laser heating (LH) was performed using ytterbium (Yb:YAG) fiber laser (1064 nanometer (nm) wavelength) focused to a top around 10-30 μm in diameter (FWHM) spot. Temperature was measured spectroradiometrically simultaneously with XRD measurements with a typical uncertainty of 150 K.

Integration of powder diffraction patterns to yield scattering intensity versus 2θ diagrams and initial analysis were performed using the DIOPTAS program. Calculated XRD patterns were produced using the POWDER CELL program for the corresponding crystal structures according to the EOSs determined experimentally and theoretically in this study and assuming continuous Debye rings of uniform intensity.

Indexing of XRD patterns was performed using the DICVOL program as implemented in the FullProf Suite.

Structures were predicted using ab-initio random structure searching (AIRSS) technique available through Material Theory Group (University of Cambridge, England). AIRSS has a proven track record of predicting structures in a diverse variety of systems that have subsequently been verified by experiment, such as in compressed silane, aluminum hydride, high-pressure hydrogen sulfide, and xenon oxides. Searches were limited to a maximum of eight formula units (24 atoms) per cell.

Synthesis of $Na_3P$ and $Li_3P$ Under Pressure

At ambient conditions, e.g., at lower pressures of less than 2 GPa and at room temperature, both $Na_3P$ and $Li_3P$ compounds crystallize in a hexagonal structure ($Na_3As$-type, space group: $P6_3/mmc$ (194)) with two formula units (Z=2) per unit cell. The time duration of forming the compounds at lower pressures of less than 2 GPa and at room temperature is less than a second. In some cases, the time duration may be in a range of milliseconds. In one case, the time duration may be in a range of microseconds.

As described herein, the Na—P and Li—P mixtures were sealed in DACs inside a glovebox at RT and the pressure was slightly increased to prevent any exposure of Na and Li to atmospheric air during the XRD experiments. More than 4 independent loadings were prepared for each mixture, with varying initial pressure in the range of 0.8-3 GPa. The XRD measurements were performed a few days (one to four) after initial pressure increase. In all independent loadings a direct reaction between Na—P and Li—P was observed toward the formation of $Na_3P$ and $Li_3P$, respectively.

Figures 6A, 6B:
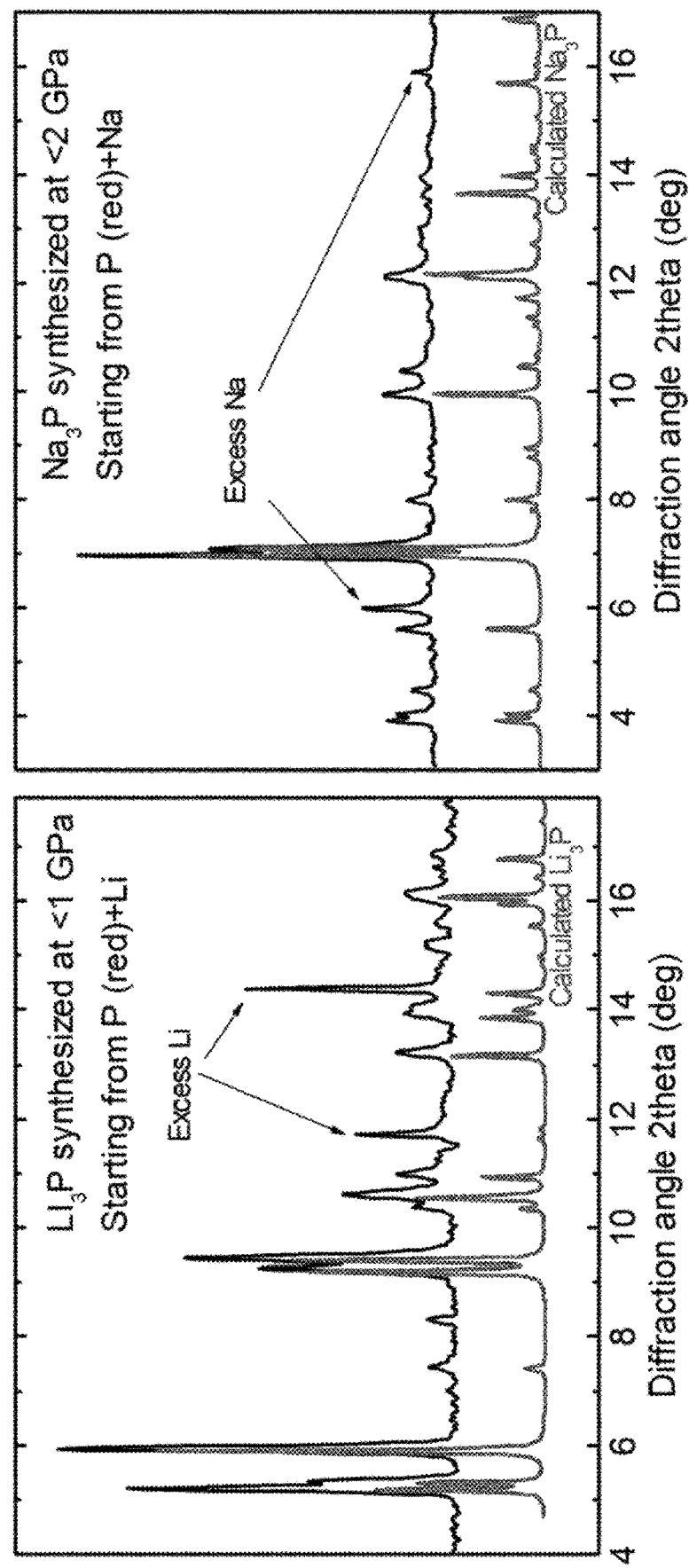
FIG. 6A is a plot of the diffraction pattern of synthesized $Li_3P$ in comparison to the calculated diffraction pattern of the known crystal structure of $Li_3P$, according to one embodiment.
FIG. 6B is a plot of the diffraction pattern of synthesized $Na_3P$ in comparison to the calculated diffraction pattern of the known crystal structure of $Na_3P$, according to one embodiment.

As shown in FIGS. 6A and 6B, the XRD patterns of the synthesized compounds substantially agreed with the XRD patterns of known crystal structures of $Li_3P$ and $Na_3P$ and at ambient conditions, respectively. FIG. 6A depicts the XRD patterns of $Li_3P$ synthesized at <1 GPa starting from P(red)+ Li. The plot shows a comparison of the diffraction patterns of synthesized Li$_3$P (upper dark pattern) to the calculated diffraction pattern of known crystal structure of Li$_3$P (lower pattern). The X-ray wavelength was λ=0.3344 Å. FIG. 5B depicts the XRD patterns of Na$_3$P synthesized at less than 2 GPa starting from P(red)+Na. The plot shows a comparison of the diffraction patterns of synthesized Na$_3$P (upper dark pattern) to the calculated diffraction pattern of known crystal structure of Na$_3$P (lower pattern). The X-ray wavelength was λ=0.2952 Å.

Detailed XRD mapping of the samples inside the DAC revealed a complete reaction of P, while an excess of Na and Li remained, as indicated on the upper patterns of FIG. 6A for excess Li and FIG. 6B for excess Na. Moreover, the size and the morphology of the synthesized Na$_3$P and Li$_3$P were practically identical with the starting piece of the powdered red-P. Without wishing to be bound by any theory, it is believed that since the melting lines of both Na and Li are well above RT in the 0-3 GPa pressure range that a solid-solid reaction may likely occur between Na/Li and P.

For synthesis process of both Li$_3$P and Na$_3$P mixtures, successful synthesis was achieved at the lowest starting pressure for each mixture, i:e: 0.8 GPa for Li—P and 1 GPa for Na—P. Upon full pressure release both the Li$_3$P and Na$_3$P compounds remained stable.

Figure 9:
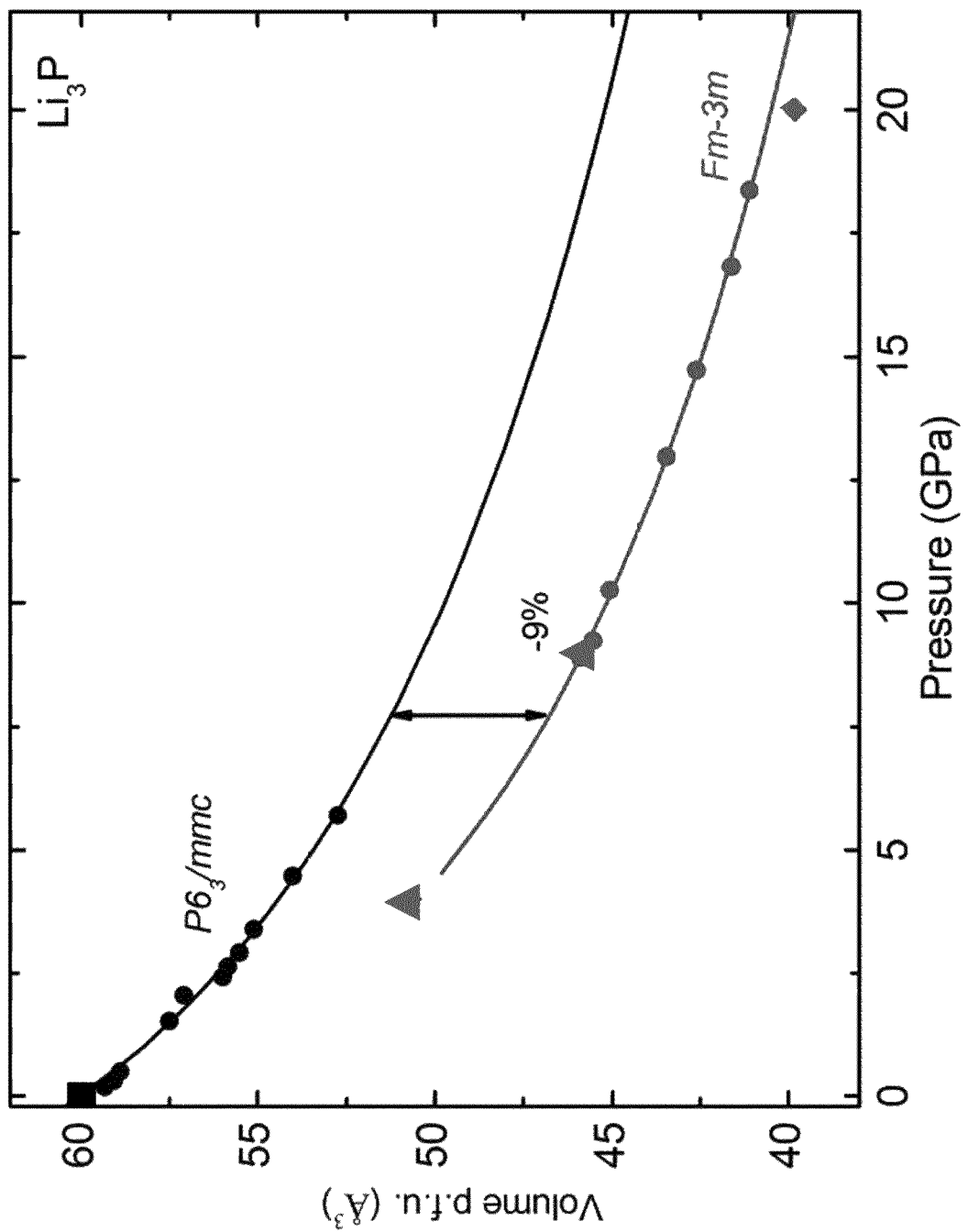
FIG. 9 is a plot of volume-pressure data for the $P6_3/mmc$ and Fm-3m phases of $Li_3P$ according to one embodiment with comparison to other studies.

From the XRD data of Li$_3$P structures synthesized under lower pressure, lattice parameters and the cell volume per formula unit ($V_{p.f.u.}$) were obtained of the two Li$_3$P structures as functions of applied pressure. As presented in FIG. 9, the results of the experimental data (●) were compared to results from a previous study at ambient conditions (■), a previous study at P=4 GPa, T=700° C. and P=9 GPa, T=RT (▲), and a previous study calculated Fm-3m (♦). For the experimental data of Li$_3$P (●), a plot of relative $V_{p.f.u.}$ versus pressure shows a volume reduction of 9% for the P6$_3$/mmc to FCC transition at about 6 GPa.

Usually, such large volume decrease is indicative of major atomic rearrangements which in this case involve the rearrangement of the two Li layers into one. A third-order Birch-Murnaghan (B-M) equation of state was fitted to the experimental pressure-volume data and used to determine the bulk modulus B and its first derivative B' at zero pressure for the P6$_3$/mmc and at the experimental onset pressure for the FCC phase. The elastic parameters obtained in this way are given in Table 1.

As shown in Table 1, experimental and calculated structural parameters of P6$_3$/mmc and Fm-3m phases of Li$_3$P at selected pressures include: space group, number

TABLE 1

Experimental and calculated structural parameters of phases of Li$_3$P at selected pressures

| Pressure (Gpa) | Space Group | Z | a (Å) | c (Å) | $V_{p.f.u.}$ (Å$^3$) | B (Gpa) | B' |
|---|---|---|---|---|---|---|---|
| 0$^a$ | P 6$_3$/mmc | 2 | 4.2730 | 7.5940 | 60.04 | | |
| 1.54 | P 6$_3$/mmc | 2 | 4.210(1) | 7.492(3) | 57.48(4) | 30(3) | 6(2) |
| 13 | Fm - 3m | 4 | 5.565(4) | | 43.08(7) | 65(3) | 5(1) |
| 20$^a$ | Fm - 3m | 4 | 5.4216 | | 39.84 | | |

$^a$Calculated structural parameters of Li$_3$P as reported in previous studies.

High Pressure Structural Study of Li$_3$P

Figure 7:
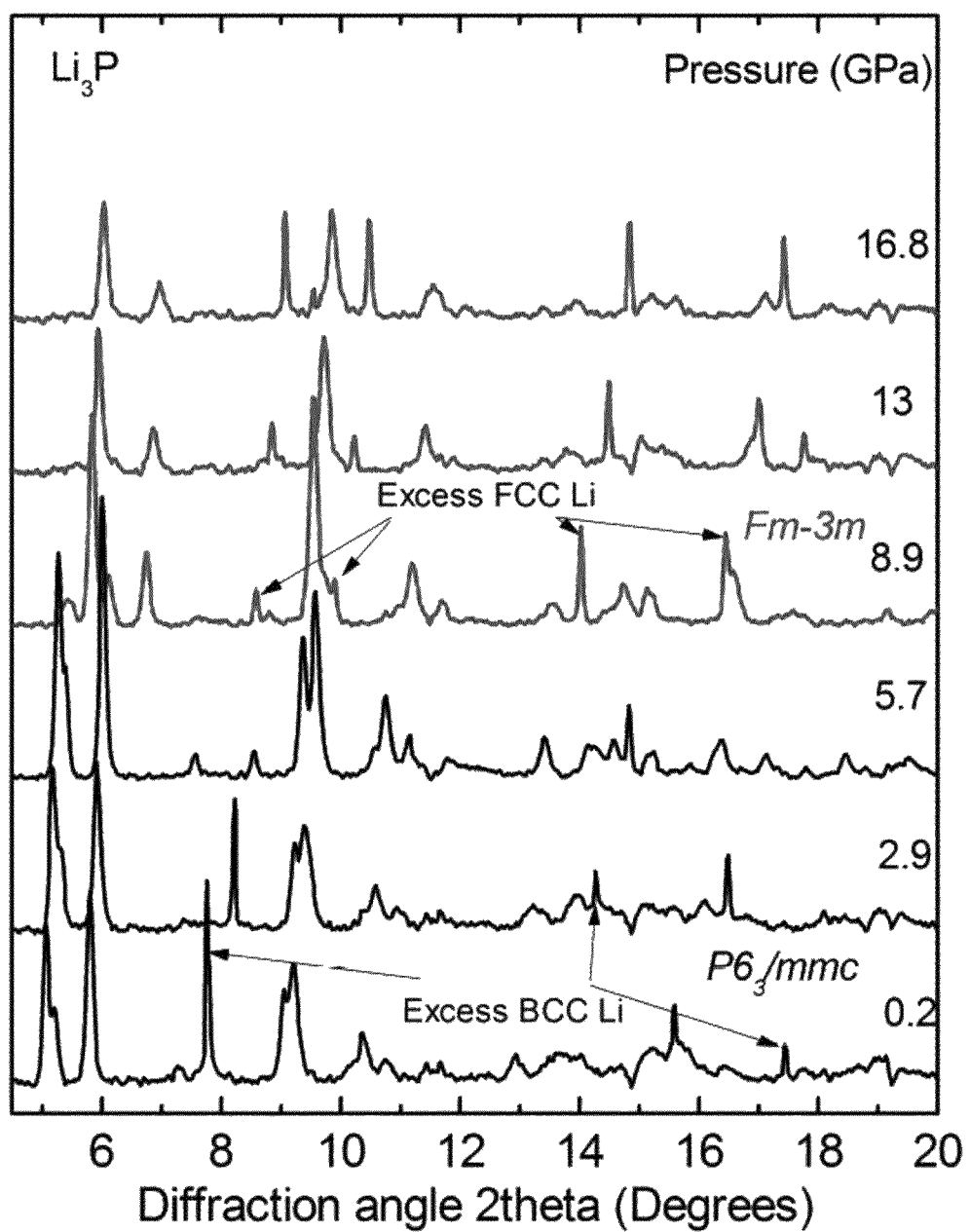
FIG. 7 is a plot of the diffraction pattern of $Li_3P$ and excess Li at selected pressures measured on pressure increase, according to one embodiment.

After successful synthesis of Li$_3$P, the synthesized compounds were analyzed by increasing the pressure up to 20 GPa. FIG. 7 shows integrated diffraction patterns of Li$_3$P at selected pressures. FIG. 7 depicts the XRD patterns of P6$_3$/mmc (upper 3 light-line patterns) and Fm-3m phases (lower 3 dark-line patterns). The X-ray wavelength was λ=0.3344 Å. The evolution of the Li$_3$P XRD data shows discontinuous changes >6 GPa, revealing the occurrence of a phase transitions. In agreement with previous reports, the body-centered cubic (BCC) structure to face-centered cubic (FCC), BCC→FCC, transition of Li was also observed near 7.5 GPa.

Figure 8B:
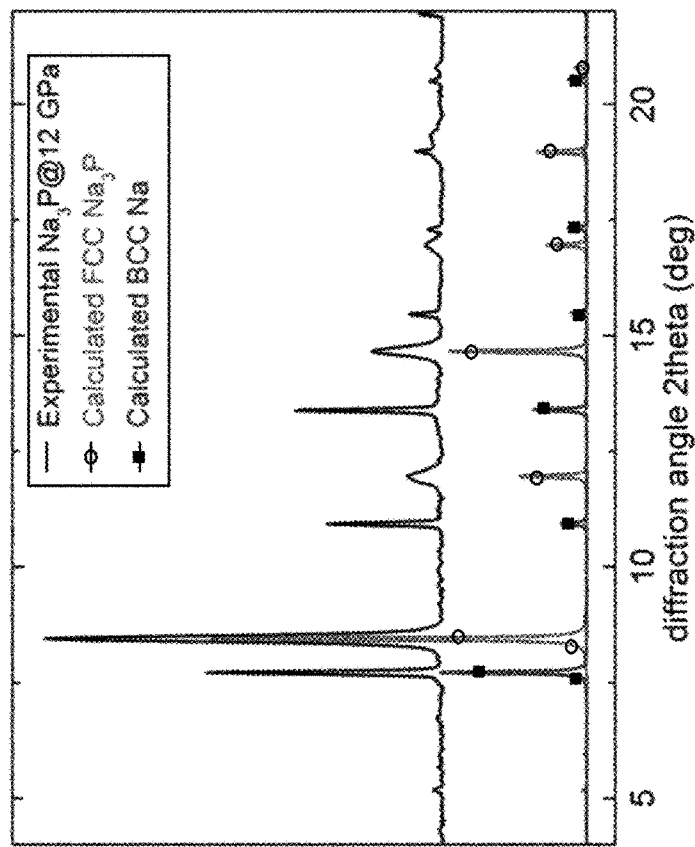
FIG. 8B is a plot of the comparison between the experimental pattern of the $Na_3P+Na$ mixture at 12 GPa and the calculated pattern of Fm-3m $Na_3P$ and BCC Na, according to one embodiment.
Figure 8A:
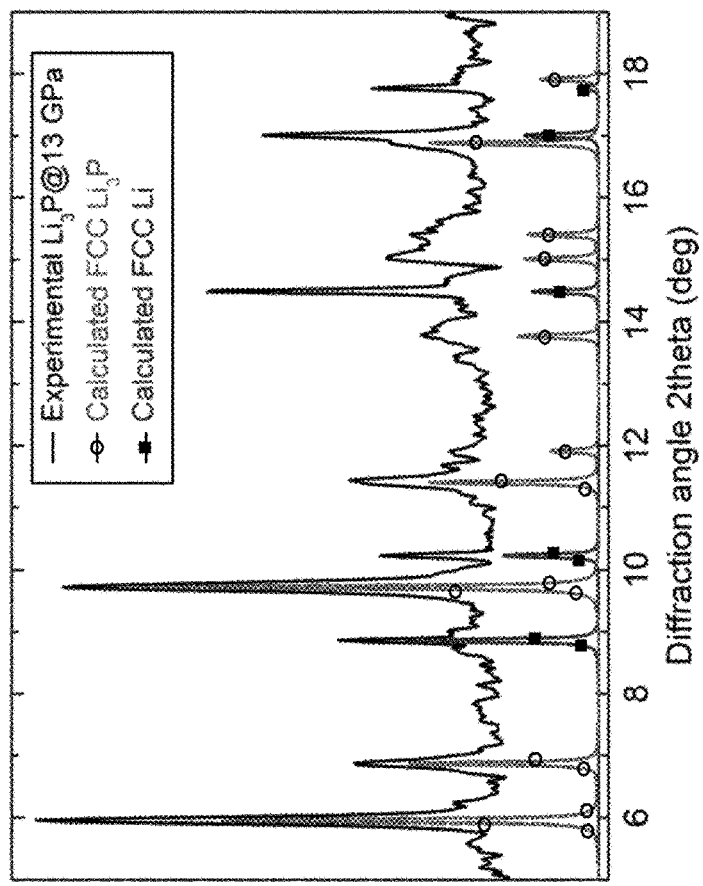
FIG. 8A is a plot of the comparison between the experimental pattern of the $Li_3P+Li$ mixture at 13 GPa and the calculated pattern of Fm-3m $Li_3P$ and FCC Li, according to one embodiment.

FIGS. 8A and 8B show the effects of high pressure phase of Li$_3$P and Na$_3$P, respectively. FIG. 8A depicts a comparison between the experimental pattern of the Li$_3$P+Li mixture at 13 GPa and the calculated patter of Fm-3m Li$_3$P and FCC Li. FIG. 8B depicts a comparison between the experimental pattern of the Na$_3$P+Na mixture at 12 GPa and the calculated pattern of Fm-3m Na$_3$P and BCC Na. The X-ray wavelength as λ=0.3344 Å.

The observed Bragg peaks of the high-pressure phase of Li$_3$P can be very well indexed with the Fm-3m (FCC) structure as predicted by others (Li$_3$Sb-type, S.G.:Fm-3m (225), Z=4) with a=5.565 Å at 13 GPa, see FIG. 8A. Without wishing to be bound by any theory, the phase transition is likely induced by a collapse of the P6$_3$/mmc phase c-axis, combined with the lithium atoms aligning into a single plane and a slight shift of the phosphorous atoms to a symmetric spacing, see part (c) FIG. 5A.

of formula units in the unit cell Z, lattice parameters (a and c), volume per formula unit ($V_{p.f.u.}$), bulk modulus (B) and its pressure derivative (B') calculated from a 3$^{rd}$ order B-M fit to the experimental results. The bulk moduli (B) and their first derivatives (B') were calculated for the P6$_3$/mmc phase at ambient pressure, and for the Fm-3m at the experimental onset pressure.

Attempts to Synthesize Li$_5$P Under Pressure

Two independent approaches were followed aiming to synthesize Li$_5$P (or Li-rich compounds in general): a) prolonged heating at temperatures of ~200° C. and b) short (few seconds) heating at temperatures>1000 K. In both cases, the pressure of the Li$_3$P+Li mixture was increased at various pressures above 10 GPa, a predicted pressure above which Li$_5$P becomes stable, and up to max 20 GPa to avoid failure of diamond anvils.

In the case of prolonged heating, the DACs were placed inside a furnace at temperatures of ~200° C. for more than 48 hours, while XRD measurements aiming to trace any reaction were performed every 12 hours. Laser heating was used for the high-temperature attempts. Several attempts demonstrated a failure of diamond anvils especially at pressures close to 20 GPa.

A few synthesis attempts were performed at pressures between 15 to 20 GPa and temperatures between 1000-2000 K. Computational predictions indicated that application of higher pressures to an elemental alkali metal and elemental phosphorous mixtures would result in Li$_5$P. However, surprisingly, no sign of the formation of a new compound Li$_5$P was observed in either approach nor in all combinations of pressure and temperature, while the compound $Li_3P$ remained stable even at high temperatures. Without wishing to be bound by any theory, successful formation of alkali metal-based phosphorous compounds at higher pressures is unpredictable.

was observed in either approaches and in all combinations of pressure and temperature while, $Na_3P$ remained stable even at high temperatures.

The inventive concepts disclosed herein have been presented by way of example to illustrate the myriad features thereof in a plurality of illustrative scenarios,

TABLE 2

Experimental and calculated structural parameters of phases of $Na_3P$ at selected pressures

| Pressure (Gpa) | Space Group | Z | a (Å) | c (Å) | $V_{p.f.u.}$ (Å$^3$) | B (Gpa) | B' |
|---|---|---|---|---|---|---|---|
| 0$^a$ | P 6$_3$/mmc | 2 | 4.98 | 8.7970 | 94.47 | | |
| 2 | P 6$_3$/mmc | 2 | 4.865(1) | 8.693(2) | 89.09(4) | 26.5(6) | 4(fixed) |
| 5.5 | Fm - 3m | 4 | 6.639(4) | | 73.15(6) | 47.8(20) | 3.3(4) |
| 5$^b$ | Fm - 3m | 4 | 6.6750 | | 74.35 | | |

Figure 10:
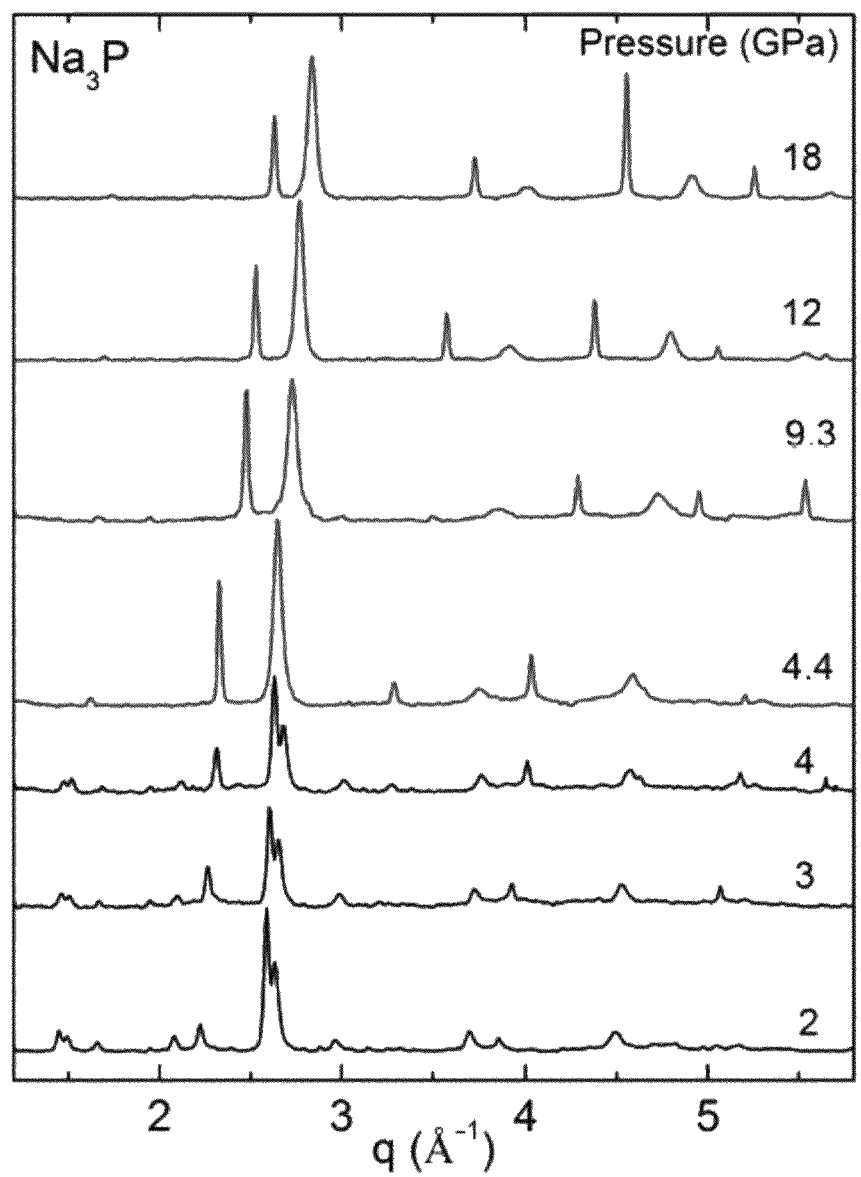
FIG. 10 is a plot of a series of diffraction patters of $Na_3P$ and excess of Na at selected pressures measured on pressure increase, according to one embodiment.

$^a$Calculated structural parameters of $Na_3P$ as reported in previous studies.
$^b$Theoretical values, according to one embodiment High Pressure Structural Study of $Na_3P$ Following successful synthesis of $Na_3P$, the pressure was increased up to 20 GPa. FIG. 10 shows integrated diffraction patterns of $Na_3P$ at selected pressures. The upper four light-line patterns represent XRD patterns of the P6$_3$/mmc phase of $Na_3P$ structure and the lower three dark-lines patterns represent the XRD patterns of the Fm-3m phase of $Na_3P$ structure. The evolution of the $Na_3P$ XRD data shows discontinuous changes >5 GPa, revealing the occurrence of a phase transitions between 4 to 6 GPa, depending on the time scale of pressure increase. A preliminary indexing of the XRD pattern at 12 GPa shows that it has a I-type cubic cell with Z=1 (f.u. per unit cell). However, this solution is not conclusive without the knowledge of atomic positions in the unit cell. Using the ab-initio random structure searching (AIRSS) technique, AIRSS results revealed that a Fm-3m (FCC) structure, of the same structural type ($Li_3$Sb-type, S.G.: Fm-3m (225), Z=4) as the one predicted in previous studies in the case of $Li_3P$, is the most stable structure for $Na_3P$ above 5 GPa. The observed Bragg peaks of the high-pressure phase of $Na_3P$ can be very well indexed with the Fm-3m (FCC) structure with a=6.428 Å at 12 GPa, see FIG. 8B.

Figure 11:
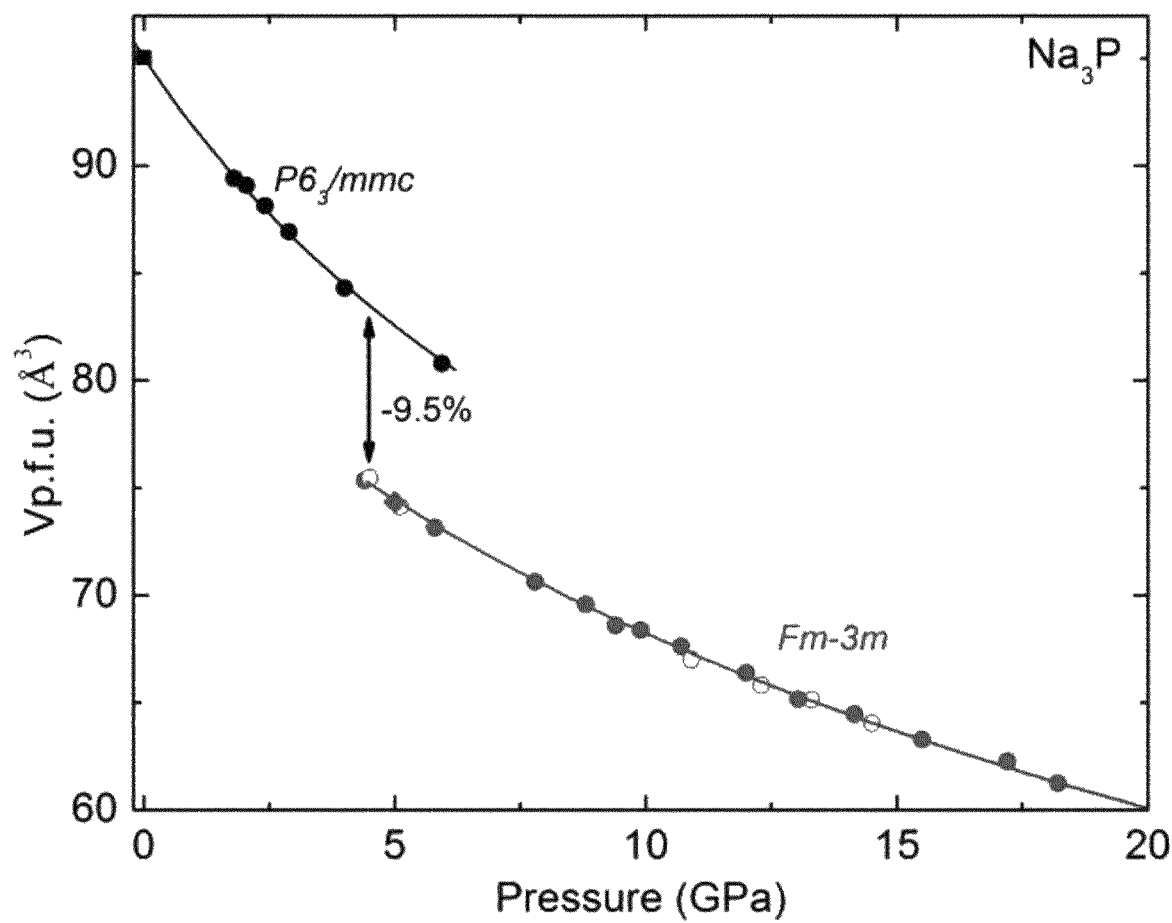
FIG. 11 is a plot of volume-pressure data for the $P6_3/mmc$ and Fm-3m phases of $Na_3P$ according to one embodiment with comparison to other studies.

From the XRD data of $Na_3P$, lattice parameters and the cell volume per formula unit ($V_{p.f.u.}$) was obtained for the P6$_3$/mmc and Fm-3m phases of $Na_3P$ as functions of pressure. The results of the experimental data (●), theoretical data (♦) and a previous study at ambient conditions (■) are presented in FIG. 11. The solid lines are unweighted third-order Birch-Murnagham EOS fits to the experimental data points. Solid and open symbols correspond to the measurements on pressure increase and decrease, respectively.

The plot of relative $V_{p.f.u.}$ versus pressure show a volume reduction of 9.5% for the P6$_3$/mmc to FCC transition at 4.4 GPa. A third-order Birch-Murnaghan equation of state was fitted to the experimental pressure-volume data to determine the bulk modulus B and its first derivative B' at zero pressure for the P6$_3$/mmc and at the experimental onset pressure for the FCC phase. The elastic parameters obtained in this way are given in Table 2.

Synthesis of $Na_5P$ Under Pressure

Similar approaches were followed as the case of the $Li_3P+Li$ mixture for $Na_3P+Na$ mixture with the exception that the pressure was increased up to 30 GPa. Similarly, with $Li_3P+Li$, no sign of the formation of a new compound $Na_5P$ embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. A method for synthesizing an alkali metal-based phosphorous compound, the method comprising:
   contacting an elemental alkali metal with elemental phosphorous to create a mixture; and
   applying a total pressure of less than 20 gigapascals to the mixture for forming the alkali metal-based phosphorous compound
   wherein the pressure is applied to the mixture at about room temperature.

2. The method as recited in claim 1, wherein the pressure is applied without applying heat to the mixture.

3. The method as recited in claim 1, comprising selecting the pressure in order to form an alkali metal-based phosphorous compound having a predefined crystal structure.

4. The method as recited in claim 1, wherein the formed alkali metal-based phosphorous compound has a face-centered cubic crystal structure.

5. The method as recited in claim 1, wherein the pressure is less than about 10 gigapascals.

6. The method as recited in claim 1, wherein the pressure is less than about 5 gigapascals.

7. The method as recited in claim 6, wherein the formed alkali metal-based phosphorous compound has a first crystal structure; and
   further comprising applying a second pressure greater than 5 gigapascals to the formed alkali metal-based phosphorous compound for causing a phase transition to a second crystal structure that is different than the first crystal structure.

8. The method as recited in claim 6, wherein the formed alkali metal-based phosphorous compound has a hexagonal crystal structure.

9. The method of claim 8, further comprising applying a second pressure greater than 5 gigapascals to the formed alkali metal-based phosphorous compound for causing a phase transition to a face-centered cubic crystal structure.

10. The method of claim 9, wherein the formed alkali metal-based phosphorous compound maintains the face-centered cubic crystal structure after release of the applied second pressure.

11. The method as recited in claim 1, wherein the pressure is less than about 2 gigapascals and greater than atmospheric pressure.

12. The method as recited in claim 1, wherein the elemental alkali metal is selected from the group consisting of: lithium, potassium, and sodium.

13. The method as recited in claim 1, wherein the elemental alkali metal and the elemental phosphorous are each in powder form.

14. A method for synthesizing an alkali metal-based phosphorous compound, the method comprising,
  contacting an elemental alkali metal with elemental phosphorous to create a mixture; and
  applying a pressure of less than 20 gigapascals to the mixture for forming the alkali metal-based phosphorous compound,
  wherein the formed alkali metal-based phosphorous compound comprises a ratio of elemental alkali metal (A) to elemental phosphorous (P), wherein the ratio of A to P increases with increasing applied pressure during the contacting.

15. The method as recited in claim 1, wherein the formed alkali metal-based phosphorous compound is $Li_3P$.

16. The method as recited in claim 1, wherein the formed alkali metal-based phosphorous compound is $Na_3P$.

17. A system comprising:
  a mixture of an elemental alkali metal and an elemental phosphorous; and
  a device for applying pressure to the mixture at about room temperature, wherein the device is configured to apply a pressure less than 20 gigapascals to the mixture, wherein the device includes a diamond anvil cell.

18. A system as recited in claim 17, wherein the pressure is less than about 5 gigapascals and greater than atmospheric pressure.

19. A system as recited in claim 17, wherein the pressure is less than about 2 gigapascals and greater than atmospheric pressure.

20. A system as recited in claim 17, wherein the system does not include added heat.

* * * * *